(12) United States Patent
Most et al.

(10) Patent No.: US 9,038,849 B2
(45) Date of Patent: May 26, 2015

(54) COATING COMPOSITIONS FOR FOOD AND BEVERAGE CONTAINERS

(71) Applicant: PPG Industries Ohio, Inc., Cleveland, OH (US)

(72) Inventors: Christopher Most, Wilder, KY (US); Robert McVay, Cincinnati, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/536,974

(22) Filed: Nov. 10, 2014

(65) Prior Publication Data

US 2015/0060472 A1 Mar. 5, 2015

Related U.S. Application Data

(62) Division of application No. 13/707,741, filed on Dec. 7, 2012.

(51) Int. Cl.
| | |
|---|---|
| *B65D 25/14* | (2006.01) |
| *B65D 81/00* | (2006.01) |
| *C09D 133/08* | (2006.01) |
| *C09D 183/04* | (2006.01) |
| *C08L 33/08* | (2006.01) |
| *C08K 5/053* | (2006.01) |
| *C09D 165/00* | (2006.01) |

(52) U.S. Cl.
CPC ............... *B65D 25/14* (2013.01); *B65D 81/00* (2013.01); *C09D 133/08* (2013.01); *C09D 183/04* (2013.01); *Y10T 428/1355* (2015.01); *C08L 33/08* (2013.01); *C08K 5/053* (2013.01); *C09D 165/00* (2013.01)

(58) Field of Classification Search
None
See application file for complete search history.

(56) References Cited

U.S. PATENT DOCUMENTS

| | | | | |
|---|---|---|---|---|
| 3,240,736 | A * | 3/1966 | Beckwith | 524/2 |
| 3,759,867 | A * | 9/1973 | Merrill et al. | 524/588 |
| 4,056,492 | A * | 11/1977 | Merrill | 528/18 |
| 4,518,727 | A * | 5/1985 | Traver | 524/35 |
| 4,803,233 | A * | 2/1989 | Narula et al. | 524/58 |
| 4,855,348 | A * | 8/1989 | Strader | 524/317 |
| 5,100,958 | A * | 3/1992 | Fuhr et al. | 525/66 |
| 5,145,898 | A * | 9/1992 | Narula et al. | 524/310 |
| 5,202,368 | A * | 4/1993 | Davies et al. | 524/266 |
| 5,250,605 | A * | 10/1993 | Hazan et al. | 524/504 |
| 5,525,427 | A * | 6/1996 | Griswold et al. | 428/447 |
| 5,731,260 | A * | 3/1998 | Abell | 502/416 |
| 6,034,225 | A * | 3/2000 | Weidner et al. | 534/730 |
| 6,756,077 | B2 * | 6/2004 | Yu | 427/387 |
| 6,774,202 | B2 * | 8/2004 | Lee | 528/33 |
| 7,886,499 | B2 * | 2/2011 | Okuda et al. | 52/750 |
| 2006/0058436 | A1 * | 3/2006 | Kasler | 524/261 |

* cited by examiner

*Primary Examiner* — Robert S Loewe
(74) *Attorney, Agent, or Firm* — William J. Uhl

(57) ABSTRACT

Compositions for coating food or beverage containers comprising a resinous binder and 10 to 30 percent by weight of a polysilicone resin.

7 Claims, No Drawings

COATING COMPOSITIONS FOR FOOD AND BEVERAGE CONTAINERS

CROSS-REFERENCE TO RELATED APPLICATION

This application is a divisional of application Ser. No. 13/707,741, filed Dec. 7, 2012.

FIELD OF THE INVENTION

The present invention relates to coating compositions that are useful for coating containers of various sorts such as food and beverage containers. The compositions are particularly useful for coating the interior of the containers.

BACKGROUND OF THE INVENTION

Coatings are typically applied to the interior of metal food and beverage containers to prevent the contents from contacting the metal surface of the container. Contact with certain foods, particularly acidic products, can cause the metal container to corrode. This corrosion results in contamination and deterioration in the appearance and taste of the food or beverage product.

Many of the coating compositions for food and beverage containers are based on epoxy resins that are the polyglycidyl ethers of bisphenol A. Bisphenol A in packaging coatings can be either bisphenol A itself (BPA) or derivatives thereof, such as diglycidyl ethers of bisphenol A (BADGE) and epoxy novolak resins. These coatings have excellent flexibility and adhesion to metal substrates. However, bisphenol A and derivatives thereof are problematic. Although the balance of scientific evidence available to date indicates that small trace amounts of BPA or BADGE that might be released from existing coatings does not pose health risks to humans. These compounds are nevertheless perceived by some as being harmful to human health. Consequently, there is a strong desire to eliminate these compounds from coatings for food and beverage containers.

Replacement coating compositions are typically based on hydroxyl group-containing polymers and aminoplast or phenolplast curing agents. Although these coatings have good adhesion, they lack the flexibility required to prevent corrosion that occurs when the coating undergoes microcracking due to severe deformation of the metal. In 2-piece food cans, for example, microcracking occurs in the headspace due to the double-seam process that affixes the can end after filling. This is commonly known as "pressure ridge" cracking. Corrosive foodstuffs infiltrate the coating through the microcracks and corrode the metal surface causing corrosion, delamination of the coating and eventual perforation of the can which spoils the food. Because of the susceptibility of acrylic-based coatings to pressure-ridge cracking, they are currently inferior to industry standard BPA-containing coatings in the packaging coatings industry because they cannot hold strongly corrosive foodstuffs.

Also, the replacement coating compositions provide coatings with poor slip properties. This poses a problem with solid foods such as canned meats. When the can is opened, the meat does not release from the interior of the can and must be manually scooped out of the can.

SUMMARY OF THE INVENTION

The present invention provides a composition comprising:
(a) a resinous binder,
(b) 10 to 30 percent by weight based on resin solids weight of a polysilicone resin.

The present invention also provides a coated article comprising:
(a) a substrate, and
(b) a coating deposited on at least a portion of the substrate from the composition described above.

The polysilicone resin increases the flexibility of the resultant coating without adversely affecting adhesion. Phenylated polysilicone resins have excellent compatibility with the organic components of the coating composition. Moreover, incorporation of the polysilicone resin in the coating composition reduces the surface tension of the coating significantly which repels water and improves surface slip offering several additional novel uses for food packaging such as meat release. Coatings for canned meats must have high surface slip allowing meat-based foodstuffs to easily be removed from the can. Additionally, the polarity of the phenylated polysilicone resins allows them to be used in water-based formulations yielding stable dispersions.

DETAILED DESCRIPTION

As used herein, unless otherwise expressly specified, all numbers such as those expressing values, ranges, amounts or percentages may be read as if prefaced by the word "about", even if the term does not expressly appear. Moreover, it should be noted that plural terms and/or phrases encompass their singular equivalents and vice versa. For example, "a" polymer, "a" crosslinker, and any other component refers to one or more of these components.

Also, although the resinous binder, including film formers, crosslinkers and the polysilicone resin are all resinous materials, it is intended that they are all different from one another.

When referring to any numerical range of values, such ranges are understood to include each and every number and/or fraction between the stated range minimum and maximum.

As employed herein, the term "polyol" or variations thereof refers broadly to a material having an average of two or more hydroxyl groups per molecule. The term "polycarboxylic acid" refers to the acids and functional derivatives thereof, including anhydride derivatives where they exist, and lower alkyl esters having 1-4 carbon atoms.

As used herein, the term "polymer" refers broadly to prepolymers, oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, ethacrylic acid, etc., and their $C_1$-$C_5$ alkyl esters, unless clearly indicated otherwise. These monomers can be polymerized by themselves or with vinyl monomers such as vinyl aromatic monomers and allylic monomers. The tens "(meth)acrylic" or "(meth)acrylate" are intended to cover both the acrylic/acrylate and methacrylic/methacrylate forms of the indicated material, e.g., a (meth)acrylate monomer. The term "acrylic polymer" refers to polymers prepared from one or more acrylic monomers.

As used herein, "a" and "the at least one" and "one or more" are used Interchangeably. Thus, for example, a coating composition that comprises "a" polymer can be interpreted to mean the coating composition includes "one or more" polymers.

As used herein, the molecular weights are determined by gel permeation chromatography using a polystyrene standard. Unless otherwise indicated, molecular weights are on a weight average basis ($M_w$).

The resinous vehicle typically consists of a resinous film former and a curing or crosslinking agent. The resinous film-forming material can be an acrylic polymer. The acrylic polymer is preferably a polymer derived from one or more acrylic monomers and other copolymerizable vinyl monomers. Furthermore, blends of acrylic polymers can be used. Preferred monomers are acrylic acid, methyl acrylate, ethyl acrylate, propyl acrylate, butyl acrylate, penta acrylate, hexyl acrylate, methacrylic acid, methyl methacrylate, ethyl methacrylate, propyl methacrylate, butyl methacrylate, penta methacrylate and hexyl methacrylate. The acrylic polymer may also contain hydroxyl groups which typically are derived from hydroxy-substituted acrylic or methacrylic acid esters. Examples include hydroxyethyl acrylate and hydroxypropyl methacrylate.

Examples of vinyl monomers are vinyl esters including vinyl acetate, vinyl propionate, vinyl butyrates, vinyl benzoates, vinyl isopropyl acetates, and similar vinyl esters. Vinyl halides include vinyl chloride, vinyl fluoride, and vinylidene chloride. Vinyl aromatic hydrocarbons include styrene, methyl styrenes, and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexyl as well as conjugated dienes such as butadiene, methyl-2-butadiene, 1,3-piperylene, 2,3-dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. Examples of allylic monomers include allyl alcohol and allyl chloride.

The acrylic polymer typically is prepared by conventional solution polymerization techniques using free radical initiators such as azo or peroxide catalyst.

The molecular weight ($M_w$) of the acrylic polymer component is preferably at least 5,000 gram/mole, more preferably from 15,000 to 100.000 gram/mole. The acrylic polymer typically has an acid value of 30 to 70, such as 40 to 60 mg KOH/g, a hydroxyl value of 20 to 100, such as 30 to 70 mg of KOH/g.

Typically curing agents are present in the resinous vehicle, which are reactive with the acrylic polymers. Suitable curing agents are phenolplasts or phenol-formaldehyde resins and aminoplast or triazine-formaldehyde resins. The phenol-formaldehyde resins are preferably of the resol type. Examples of suitable phenols are phenol itself, butyl phenol, xylenol and cresol. Cresol-formaldehyde resins, typically etherified with butanol, are often used. For the chemistry in preparation of phenolic resins, reference is made to "The Chemistry and Application of Phenolic Resins or Phenolplasts", Vol. V, Part I, edited by Dr. Oldring; John Wiley & Sons/Cita Technology Limited, London, 1997. Examples of commercially available phenolic resins are PHENODUR® PR285 and BR612 and those resins sold under the trademark BAKELITE®, typically BAKELITE 6581 LB.

Examples of aminoplast resins are those which are formed by reacting a triazine such as melamine or benzoguanamine with formaldehyde. Preferably, these condensates are etherified typically with methanol, ethanol, butanol including mixtures thereof. For the chemistry preparation and use of aminoplast resins, see "The Chemistry and Applications of Amino Crosslinking Agents or Aminoplast", Vol. V, Part II, page 21 ff., edited by Dr. Oldring: John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec industries.

The silicone resins that are used in the practice of the invention are functional silicone resins, that is, they contain functional groups that are reactive with functional groups associated with the resinous binder. Typically, these groups are active hydrogen groups that are reactive with cofunctional groups associated with the curing or crosslinking agent of the resinous binder such as aminoplast or phenolplast. Also, the silicone resins can be phenylated silicone resins containing a $C_6H_5$—$S\equiv$ bond. The phenyl group is beneficial in that it compatibilizes the silicone resin with the other resinous ingredients in the coating composition in that all of the resinous ingredients can be uniformly dissolved or dispersed in a diluent, that is, the silicone resin will not form a separate phase from the other resinous ingredients in the coating composition.

The phenylated silicone resin used in the composition according to the invention is advantageously an alkyl-phenyl silsesquioxane resin.

This resin advantageously comprises units of the following formulae:

$$(R'SiO_{3/2})_x$$

and $$(C_6H_5SiO_{3/2})_y$$

R' is selected from the group consisting of a linear or branched alkyl group comprising from 1 to 20 carbon atoms, such as from 2 to 8 carbon atoms, a cycloalkyl group comprising from 5 to 20 carbon atoms, such as from 6 to 12 carbon atoms, and a hydroxyl group, and x and y independently ranging from 0.05 to 0.95, such that x is 0.1 to 0.3 and y is 0.7 to 0.9, and x+y=1.

x and y representing the mole fraction of the siloxane units $(R'SiO_{3/2})_x$ and $(C_6H_5SiO_{3/2})_y$ with respect to the total number of moles of siloxane units in the phenylated silicone resin.

Usually R' is a mixed alkyl group and hydroxyl group such that the silicone resin has a hydroxyl content of 3 to 20, such as 5 to 10 percent by weight based on solid weight of the silicone resin.

The phenylated silicone resin advantageously comprises at least 20 mole percent, preferably at least 30 mole percent, better still at 40 mole percent, even better still at least 50 mole percent and better still at least 60 mole percent of siloxane units $(R'SiO_{3/2})_x$ and $(C_6H_5SiO_{3/2})_y$, with respect to the total number of siloxane units present in the phenylated silicone resin.

According to one embodiment, the content of siloxane units $(R'SiO_{3/2})_x$ and $(C_6H_5SiO_{3/2})_y$, can range up to 100 mole percent, with respect to the total number of siloxane units present in the phenylated silicone resin.

Examples of alkyl groups are methyl, ethyl and propyl; examples of cycloalkyl groups are cyclohexyl.

The alkyl-phenyl silsesquioxane resins can contain additional siloxy units such as (i) $(R^1{}_3SiO_{1/2})_a$, (ii) $(R^2{}_2SiO_{2/2})_b$, (iii) $(R^3SiO_{3/2})_c$, or (iv) $(SiO_{4/2})_d$ units. The amount of each unit present in the alkyl-phenyl silsesquioxane resin can be expressed as a mole fraction of the total number of moles of all siloxy units present in the alkyl-phenyl silsesquioxane resin. Thus, the alkyl-phenyl silsesquioxane resins of the present invention comprise the units:

(I) $(R^1{}_3SiO_{1/2})_a$
(ii) $(R^2{}_2SiO_{2/2})_b$
(iii) $(R^3SiO_{3/2})_c$
(iv) $(SiO_{4/2})_d$ (v) $(R'SiO_{3/2})_x$ and
(vi) $(C_6H_5SiO_{3/2})_y$,
wherein
R' is defined above,
$R^1$, $R^2$ and $R^3$ are independently an alkyl group having from 1 to 8 carbon atoms such as methyl, ethyl and propyl; an aryl group such as phenyl and tolyl, a hydroxyl group, a carbinol group or an amino group,
a, b, c and d have a value of zero to 0.4,
x and y have a value of 0.05 to 0.95, such as x having a value of 0.1 to 0.3 and y having a value of 0.7 to 0.9,
with the provisos that the value of x+y is equal to or greater than 0.60, and the value of a+b+c+d+x+y=1.

Typically, the acrylic polymer and/or the polyester polymer is used in amounts of 40 to 85, such as 30 to 70 percent by weight; the crosslinking agent is present in amounts of 6 to 50, such as 15 to 40 percent by weight and the polysilicane resin is present in amounts of 10 to 30, such as 15 to 20 percent by weight; the percentages by weight being based on the weight of total resin solids in the coating composition.

Optional ingredients can be included in the coating composition. Typically, the coating composition will contain a diluent, such as water, or an organic solvent or a mixture of water and organic solvent to dissolve or disperse the ingredients of the composition. The organic solvent is selected to have sufficient volatility to evaporate essentially entirely from the coating composition during the curing process such as during heating from 175-205° C. for about 5 to 15 minutes. Examples of suitable organic solvents are aliphatic hydrocarbons such as mineral spirits and high flash point VM&P naphtha; aromatic hydrocarbons such as benzene, toluene, xylene and solvent naphtha 100, 150, 200 and the like; alcohols, for example, ethanol, n-propanol, isopropanol, n-butanol and the like; ketones such as acetone, cyclohexanone, methylisobutyl ketone and the like; esters such as ethyl acetate, butyl acetate, and the like; glycols such as butyl glycol, glycol ethers such as methoxypropanol and ethylene glycol monomethyl ether and ethylene glycol monobutyl ether and the like. Mixtures of various organic solvents can also be used. For aqueous compositions, the resinous vehicle typically has acid groups, such as acid functional acrylic polymers, that are at least partially neutralized with an amine to assist in the dispersion or dissolution of the resinous vehicle in the aqueous medium. When present, the diluent is used in the coating compositions in amounts of about 20 to 80, such as 30 to 70 percent by weight based on total weight of the coating composition.

Adjuvant resins such as polyester polyols, polyether polyols and polyurethane polyols may be included in the coating compositions to maximize certain properties of the resultant coating. When present, the adjuvant resin is used in amounts of up to 50, typically 2-50 percent by weight based on weight of resin solids of the coating composition.

Another optional ingredient that is typically present in the coating composition is a catalyst to increase the rate of cure or crosslinking of the coating compositions. Generally acid catalyst may be used and is typically present in amounts of about 0.05 to 5 percent by weight. Examples of suitable catalyst are dodecyl benzene sulfonic acid, methane sulfonic acid, paratoluene sulfonic acid, dinonyl naphthalene disulfonic acid and phenyl phosphanic acid.

Another useful optional ingredient is a lubricant, for example, a wax which facilitates manufacture of metal closures by imparting lubricity to the sheets of the coated metal substrate. Preferred lubricants include, for example, carnauba wax and polyethylene-type lubricants. If used, the lubricant is preferably present in the coating compositions of at least 0.1 percent by weight based on weight of resin solids in the coating composition.

Another useful optional ingredient is a pigment such as titanium dioxide. If used, the pigment is present in the coating compositions in amounts no greater than 70 percent by weight, preferably no greater than 40 percent by weight based on total weight of solids in the coating composition.

Surfactants can optionally be added to the coating composition to aid in flow and wetting of the substrate. Examples of suitable surfactants include, but are not limited to, nonyl phenol polyether and salts. If used, the surfactant is present in amounts of at least 0.01 percent and no greater than 10 percent based on weight of resin solids in the coating composition.

In certain embodiments, the compositions used in the practice of the invention are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof, are not intentionally added but may be present in trace amounts because of unavoidable contamination from the environment. The compositions can also be substantially free and may be essentially free and may be completely free of bisphenal F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above-mentioned compounds, derivatives or residues thereof.

The compositions of the present invention can be prepared according to methods well known in the art. For example, using an acid functional acrylic polymer as the resinous vehicle, the polymer is neutralized with an amine to between 20-80 percent of the total theoretical neutralization. The neutralized acrylic polymer is then dispersed in water followed by the addition of polysilicone resin. The mixture is then thinned with more water to achieve a manageable viscosity. Crosslinkers and additives are then added followed by thinning with additional water to achieve the desired solids and viscosity.

As mentioned above, the coating compositions of the present invention can be applied to containers of all sorts and are particularly well adapted for use on food and beverage cans (e.g., two-piece cans, three-piece cans, etc.).

The compositions can be applied to the food or beverage container by any means known in the art such as roll coating, spraying and electrocoating. It will be appreciated that for two-piece food cans, the coating will typically be sprayed after the can is made. For three-piece food cans, a flat sheet will typically be roll coated with one or more of the present compositions first and then the can will be formed. As noted above, the percent solids of the composition can be adjusted based upon the means of application. The coating can be applied to a dry film weight of 24 mgs/4 $in^2$ to 12 mgs/4 $in^2$, such as 20 mgs/4 $in^2$ to 14 mgs/4 $in^2$.

After application, the coating is then cured. Cure is effected by methods standard in the art. For coil coating, this is typically a short dwell time (i.e., 9 seconds to 2 minutes) at high heat (i.e., 485° F. (252° C.) peak metal temperature); coated metal sheets typically cure longer (i.e., 10 minutes) but at lower temperatures (i.e., 400° C. (204° C.) peak metal temperature). For spray applied coatings on two-piece cans, the cure can be from 5 to 8 minutes, with a 90-second bake at a peak metal temperature of 415° F. (213° C.) to 425° F. (218° C.).

Any material used for the formation of food cans can be treated according to the present methods. Particularly suitable substrates include tin-plated steel, tin-free steel and black plated steel.

The coatings of the present invention can be applied directly to the steel, without any pretreatment or adhesive aid being added to the metal first. In addition, no coatings need to be applied over top of the coatings used in the present methods.

The compositions of the present invention perform as desired both in the areas of adhesion and flexibility.

EXAMPLES

The following examples are offered to aid in understanding of the present invention and are not to be construed as limiting the scope thereof. Unless otherwise indicated, all parts and percentages are by weight.

Example 1

A coating composition was prepared from the following ingredients:

| Ingredients | Parts by Weight | Percent by Weight Based on Total Coating Composition Weight | Percent by Weight Based on Weight of Resin Solids |
|---|---|---|---|
| Cowles Grind | | | |
| Acrylic Resin 50% resin solids in butanol[1] | 670 | 14.0 | 33.7 |
| Dimethylethanolamine | 38.9 | 0.8 | |
| PR 516 Phenolic 50% resin solids in butanol[2] | 899 | 18.8 | 43.4 |
| TiO$_2$ | 349 | 7.3 | |
| Epikure 3100 80% resin solids in isopropanol[3] | 58.5 | 1.2 | 4.5 |
| Deionized water | 728 | 15.2 | |
| Let Down in Thin Tank | | | |
| PR 516 Phenolic 50% Resin solids in butanol | 170 | 3.6 | 8.2 |
| Butanol | 38 | 0.8 | |
| 2-butoxy ethanol | 98 | 2.0 | |
| Channel Black Dispersion | 52 | 1.1 | |
| Oleic acid | 9 | 0.2 | |
| Caprilic acid | 9 | 0.2 | |
| Polysilicone Resin 70% Resin solids in butanol[4] | 150 | 3.1 | 10.1 |
| Surfynol 104[5] | | | |
| Deionized water | 1500 | 31.3 | |
| | 4802 | 100.3 | 100 |

[1]Acrylic Resin was prepared using conventional solution polymerization techniques using a peroxide catalyst. The resin had a methacrylic acid/styrene/butyl acrylate/ethyl acrylate weight ratio of 25/30/20/25 and an M$_w$ of 20,000 to 50,000.
[2]Cresol phenolic available from Cytec Industries.
[3]Amine terminated polyamide from Momentive.
[4]Xiameter RSN217 from Dow Corning.
[5]Acetylenic diol from Air Products.

The Cowles Grind paste is prepared by combining the constituents listed in the order of addition shown using a commercial Cowles mixer set to high speed. Grind to no higher than 100° F. (38° C.) or until Fineness of Grind gauge indicates grind less than 6.5 microns. Withhold deionized water until fineness of grind is achieved and paste is ready for let-down. Once deionized water has been added to grind paste, pump grind paste into thin-down tank. Begin mixing at high speed; add let-down constituents in order shown. Adjust finished coating to desired viscosity with deionized water.

Example 2 (Comparative)

A coating composition similar to Example 1 was prepared but omitting the polysilicone resin.

Example 3 (Comparative)

A coating composition similar to Example 1 was prepared but substituting a polyethylene wax for the poi silicone resin. The composition was prepared from the following ingredients:

| Ingredients | Parts by Weight | Percent by Weight Based on Weight of Resin Solids |
|---|---|---|
| Cowles Grind | | |
| Acrylic Resin of Ex. 1 | 709 | 31.5 |
| Dimethylethanolamine | 83 | |
| TiO$_2$ | 574 | |
| Epikure 3100 of Ex. 1 | 71 | 4.8 |
| Deionized Water | 777 | |
| Let Down in Thin Tank | | |
| PR 516 of Ex. 1 | 1140 | 60.2 |
| 2-butoxyethanol | 130 | |
| Butanol | 210 | |
| Mineral Spirits | 57 | |
| Channel Black Dispersion | 53 | |
| Polyethylene Dispersion[1] | 165 | 3.5 |
| Surfynol 104 | 98 | |
| Deionized Water | 1700 | |
| Deionized Water | 250 | |
| | 6051 | 100 |

[1]Michelman ML103DIF.

The Cowles Grind paste is prepared as Example 1 by combining the constituents listed in the order of addition shown using a commercial Cowles mixer set to high speed. Grind to no higher than 100° F. (38° C.) or until Fineness of Grind gauge indicates grind less than 6.5 microns. Withhold deionized water until fineness of grind is achieved and paste is ready for let-down. Once deionized water has been added to grind paste, pump grind paste into thin-down tank. Begin mixing at high speed; add let-down constituents, including Michelman ML103DIF lubricant additive in order shown. Adjust finished coating to desired viscosity with deionized water.

Examples 1-3 were spray applied to the interior of 211×400 electro tin plated steel D&I cans at a film weight of 220 mg, +/−10 mg; and/or can ends at a coating weight of 16-18 mg/4 in$^2$. The spray applied coating is cured by heating the D&I can in a four zone IBO oven to achieve 400° F. (204° C.) on the dome (e.g., bottom of can) for 90 seconds for 5 minutes total bake. The roll applied coating is cured by heating the coated steel sheet for 12 minutes at 400° F. (204° C.). The coil applied coating is cured for 18 seconds with a PMT of 500° F. (260° C.) for 3 to 5 seconds. The can ends were seamed onto the cans containing a meat based ground beef composition that simulates dog food. The cans were filled to ½" headspace and were steam processed for 90 minutes at 121° C. and evaluated for microcracking in the headspace by testing metal exposure and visible corrosion. The results are reported below:

| Examples | Evaluation |
|---|---|
| 1 | No microcracking |
| 2 | Severe microcracking |
| 3 | Severe microcracking |

The coatings of Examples 1-3 were also evaluated for slip or meat release properties. The test that was used was to fill the steel cans coated as described above with the coating compositions of Examples 1-3 with a ground beef composition that simulated dog food. The composition is made from equal parts by volume of ground beef (30 percent fat), Quaker Oats and eggs. This composition was mixed well and placed into 3 cans as described above for each coating being tested. After steam processing and cooling overnight, the cans were opened and the cans inverted and shook up to five (5) times to release the contents from the interior of the can. The results are reported below:

| Examples | Evaluation |
|---|---|
| 1 | Complete release |
| 2 | Meat had to be pulled out with a fork |
| 3 | Partial release with some residual meat clinging to coating surface |

What is claimed is:

1. A coated article comprising:
    (a) a food or beverage container comprising a metal can, and
    (b) a coating deposited on the interior portion of the food or beverage container from a composition comprising:
        (i) a resinous binder comprising:
            (A) a polymer containing reactive functional groups, and
            (B) a curing agent that has groups that are reactive with the functional groups of the polymer, and
        (ii) a polysilicone resin.

2. The coated article of claim 1 in which the polymer is an acrylic polymer.

3. The coated article of claim 1 in which the curing agent comprises an aminoplast or a phenolplast.

4. The coated article of claim 1 in which the polysilicone resin contains functional groups that are reactive with the functional groups of the curing agent.

5. The coated article of claim 1 in which the polysilicone resin is an alkyl-phenyl silsesquioxane resin.

6. The coated article of claim 1 in which the polysilicone resin has a hydroxyl content of 3 to 20 percent by weight based on total weight of the polysilicone resin.

7. The coated article of claim 1 in which the coating composition is dispersed in aqueous medium.

\* \* \* \* \*